Feb. 5, 1924.

G. C. MATHER

GEAR SHIFT LOCK

Filed July 5, 1918

Inventor

Gurdon C. Mather

Attorneys

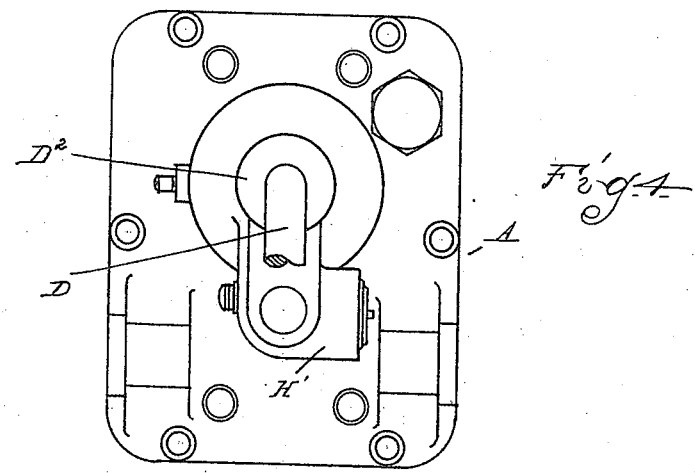
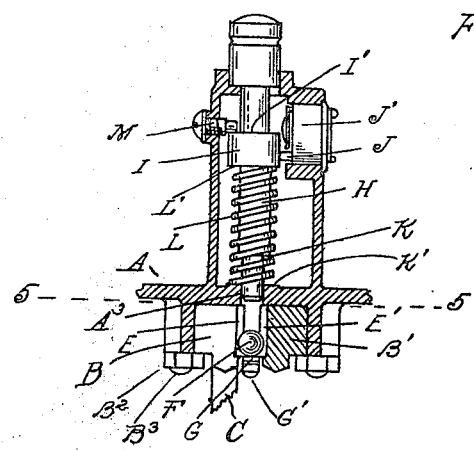
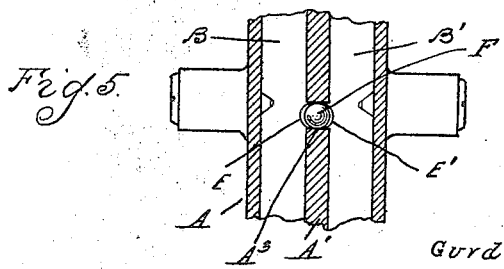

Patented Feb. 5, 1924.

1,482,476

UNITED STATES PATENT OFFICE.

GURDON C. MATHER, OF DETROIT, MICHIGAN.

GEAR-SHIFT LOCK.

Application filed July 5, 1918. Serial No. 243,283.

*To all whom it may concern:*

Be it known that I, GURDON C. MATHER, a citizen of the United States of America, residing at Detroit, in the county of Wayne and State of Michigan, have invented certain new and useful Improvements in Gear-Shift Locks, of which the following is a specification, reference being had therein to the accompanying drawings.

The invention relates to locking mechanism designed for use upon motor vehicles and has for one of its objects the provision of locking means for directly engaging the gear shifter rods. Another object is to obtain a construction in which the locking means is mounted in the housing for the shifter rods and is operable from outside the housing. A further object is to obtain a construction in which the locking means is engageable in recesses in the shifter rods, which recesses are alternatively engaged by a member for locking one shifter rod in neutral position while the other is being actuated. Still other objects of the invention reside in the novel arrangements and combinations of parts as more fully hereinafter set forth.

In the drawings:

Figures 2 and 3 are sections at right angles to that in Figure 1 and respectively showing the locking mechanism in and out of engagement with the shifting mechanism;

Figure 4 is a top plan view of the housing;

Figure 5 is a section on the line 5—5 of Figure 3.

Figure 1:
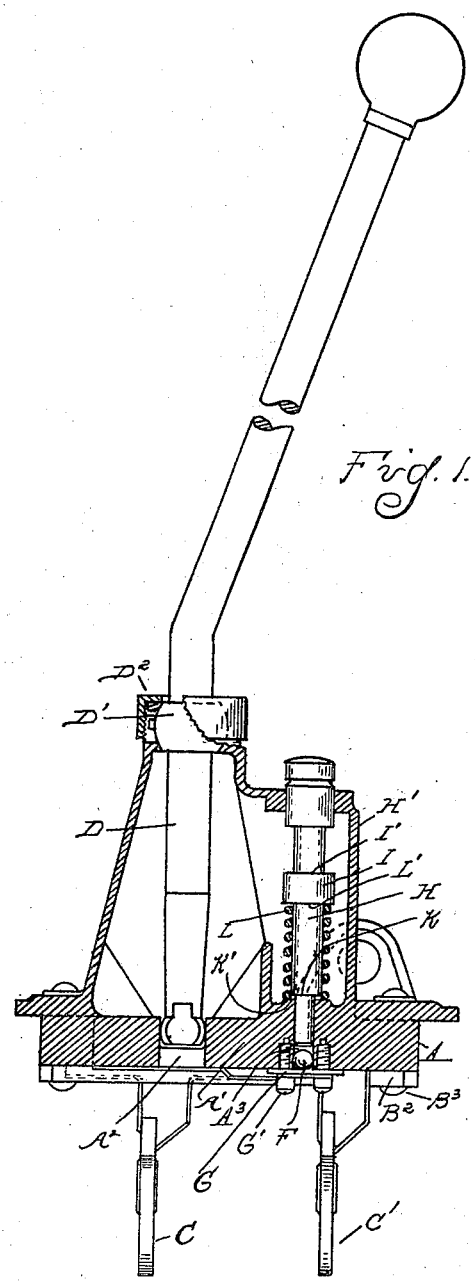
Figure 1 is a longitudinal section through a portion of the housing for the gear shifting mechanism, showing the shifting mechanism and the locking mechanism applied thereto.
Figure 2:
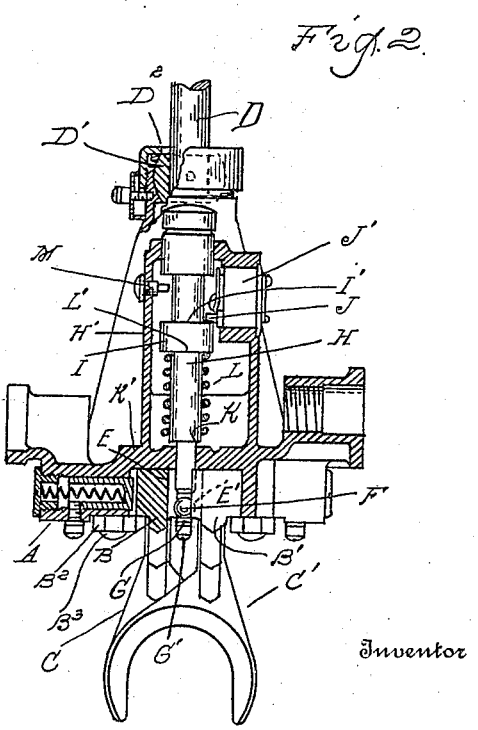

A is the cover plate for the gear housing (not shown) and is also the housing for the gear shifting mechanism, which comprises the shifter rods B and B′ slidably mounted in the housing and secured thereto by the plates B² secured to the inner face of the housing by the studs B³. The shifter rods B and B′ are respectively provided with the shifter forks C and C′ for adjusting the gears (not shown) and the rods are longitudinally movable and adapted to be alternatively actuated by the shifter lever D having the spherical socket member D′ at the upper end of the housing A retained to its seat by the cap member D² having a threaded engagement with the housing. The housing has the web or the wall A′ extending between the shifter rods B and B′ and this wall has the opening A² therethrough permitting of lateral movement of the shifter lever D so that its lower end may engage either of the shifter rods when the gears are in neutral position to longitudinally move the rods and shift the gears.

For locking either shifter rod when the other is being moved, the shifter rods B and B′ respectively have the corresponding transverse grooves E and E′ in their inner or adjacent faces, which grooves are alternatively engageable by the ball F. For permitting of this alternative engagement the web or wall A′ is cut away at A³ for its entire height and the ball is suitably supported as by the plate G secured to the inner or lower side of the cover plate by the studs G′.

To effectively lock the gear shifting mechanism, I have provided means for engaging the shifter rods and preventing their longitudinal movement from neutral position. This comprises a locking bar H vertically slidable in a bearing H′ which is formed at one side of the housing A and is preferably integral therewith. The lower end of the bar H is adapted to slidably engage in the opening A³ in the web or wall A′ and is also adapted to engage in the transverse grooves E and E′ in the shifter rods B and B′ when the latter are in neutral position, thereby preventing longitudinal movement of either shifter rod. The locking bar H also has the enlargement I forming the upper shoulder I′ which is adapted to be engaged by the locking pin J of the lock J′ located in the side face of the bearing H′. This locking pin is adapted to automatically move laterally inward to engage with the shoulder I′ when the locking bar H has been moved inward into engagement with the grooves E and E′ in the shifter rods and is withdrawn from engagement with the shoulder by suitable mechanism (not shown) controlled by the lock.

For the purpose of limiting the inward movement of the locking bar the latter has the shoulder K adapted to engage the upper face of the lateral web or wall K′ forming the guide for the upper faces of the shifter rods B and B′. The locking bar H is normally retained in its outer position by means of the coil spring L surrounding the locking bar and having its ends abut against the upper face of the lateral web or wall K′ and the lower shoulder L' formed by the enlargement I. For limiting the outward movement of the locking bar the stud M is provided threadedly engaging the side wall of the bearing H' and adapted to engage with the shoulder 1' when the locking bar is in its outer position. The outer end of the locking bar projects through the bearing H' so that in order to lock the gear shifting mechanism, all that is necessary is to press down upon the outer end of the locking bar H and force its inner end into engagement with the grooves E and E' in the shifter rods B and B' when the locking pin J automatically engages the shoulder I' upon the bar and retains the bar in its inner position, the shoulder K upon the bar limiting any further inward movement of the bar and preventing the damaging of the mechanism.

What I claim as my invention, is:

1. The combination with a housing for gear shifting mechanism and shifter rods mounted in said housing, said rods having corresponding transversely-extending grooves in their adjacent faces, of a bar mounted in said casing and engageable with said grooves, a shoulder on said bar engageable with said housing above said shifter rods upon movement of said bar when engaging said grooves, a second shoulder on said bar, and a member on said housing engageable with said second shoulder when said bar is in its normal outer position.

2. The combination with a housing for gear shifting mechanism and shifter rods mounted in said housing, said rods having corresponding transversely-extending grooves in their adjacent faces, of a bar mounted in said casing and engageable with said grooves, a shoulder on said bar engageable with said housing above said shifter rods upon movement of said bar when engaging said grooves, a second shoulder on said bar, and a lock for automatically engaging said second shoulder when the bar is in engagement in said grooves.

3. The combination with a pair of gear shifter rods, having recesses in their adjacent faces and a member alternatively engageable in said recesses, of a single locking bar engageable in said recesses in both of said gear-shifter rods.

4. The combination with a pair of gear-shifter rods, having grooves in their adjacent faces, a member alternatively engageable in said grooves, and a housing for said rods and member, of a single locking bar extending within said housing and engageable in said grooves in both of said gear-shifter rods.

5. The combination with a housing for gear shifting mechanism having a transversely extending wall, of shifter rods slidable transversely of said housing adjacent to the inner face of said wall, said rods having corresponding transversely-extending grooves in their adjacent faces, a bar mounted in said casing and engageable with said grooves, a shoulder on said bar engageable with the outer face of said wall upon movement of said bar when engaging in said grooves, a second shoulder on said bar, a member on said housing engageable with said second shoulder when said bar is in its outer position, and means for locking said bar when the latter is in engagement with said grooves.

6. The combination with a housing for gear shifting mechanism and shifter rods mounted in said housing, said rods having corresponding transversely-extending grooves in their adjacent faces, of a bar mounted in said casing and engageable with said grooves, a shoulder on said bar engageable with said housing above said shifter rods upon movement of said bar when engaging said grooves, an enlargement on said bar, a coil spring around said bar and abutting the lower end of said enlargement and said housing for normally forcing said bar outward out of engagement with said grooves, a stop on said housing engageable with the upper end of said enlargement for limiting the outward movement of said bar, and a lock engageable with the upper end of said enlargement when said bar is in engagement with said grooves.

7. The combination with a housing including a lateral wall for gear shifting mechanism, and shifter rods mounted in said housing below said wall, said rods having corresponding transversely extending grooves in their adjacent faces, of a bar mounted in said casing and slidable through said wall into engagement with said grooves, and means upon said bar above its groove engaging portion engageable with said wall to limit the engaging movement of said bar.

In testimony whereof I affix my signature.

GURDON C. MATHER.